US010469500B1

(12) United States Patent
Theimer et al.

(10) Patent No.: US 10,469,500 B1
(45) Date of Patent: *Nov. 5, 2019

(54) ENFORCEABLE LAUNCH CONFIGURATIONS

(71) Applicant: Amazon Technologies, Inc., Seattle, WA (US)

(72) Inventors: Marvin M. Theimer, Bellevue, WA (US); Eric Jason Brandwine, Haymarket, VA (US); Marc J. Brooker, Seattle, WA (US); David Everard Brown, Cape Town (ZA); Christopher Richard Jacques de Kadt, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 107 days.

This patent is subject to a terminal disclaimer.

(21) Appl. No.: 15/470,495

(22) Filed: Mar. 27, 2017

Related U.S. Application Data

(63) Continuation of application No. 14/683,460, filed on Apr. 10, 2015, now Pat. No. 9,614,873, which is a
(Continued)

(51) Int. Cl.
*G06F 15/173* (2006.01)
*H04L 29/06* (2006.01)
(Continued)

(52) U.S. Cl.
CPC ........ *H04L 63/101* (2013.01); *G06F 9/44505* (2013.01); *G06F 9/45558* (2013.01);
(Continued)

(58) Field of Classification Search
CPC ..... H04L 63/20; H04L 63/101; H04L 63/105; G06F 9/44505; G06F 9/4558; G06F 2009/4557; G06F 2009/45595
See application file for complete search history.

(56) References Cited

U.S. PATENT DOCUMENTS 7,886,021 B2   2/2011   Scheifler et al.
8,332,688 B1   12/2012  Tompkins
(Continued)

OTHER PUBLICATIONS

U.S. Appl. No. 12/979,863 , "Notice of Allowance", dated May 30, 2013, 9 pages.
(Continued)

*Primary Examiner* — Abdullahi E Salad
(74) *Attorney, Agent, or Firm* — Kilpatrick Townsend & Stockton LLP

(57) ABSTRACT

Users intending to launch instances or otherwise access virtual resources in a multi-tenant environment can specify a launch configuration. For each type of instance or each type of user, at least one launch configuration is created that includes parameters and values to be used in instantiating an instance of that type, the values being optimized for the current environment and type of instance. Launch configurations can be optimized for different types of users, such as to account for security credentials and access levels. Such an approach enables users to launch instances by contacting the resource provider directly without need for a proxy, which can function as a choke point under heavy load. The use of an appropriate launch configuration can be enforced for any type of user at any level, such as at the sub-net level, by modifying a request that does not specify an appropriate launch configuration.

19 Claims, 5 Drawing Sheets

Related U.S. Application Data continuation of application No. 13/967,146, filed on Aug. 14, 2013, now Pat. No. 9,009,323, which is a continuation of application No. 12/979,863, filed on Dec. 28, 2010, now Pat. No. 8,560,699.

(51) Int. Cl.
*G06F 9/445* (2018.01)
*G06F 9/455* (2018.01)

(52) U.S. Cl.
CPC ........ *H04L 63/0272* (2013.01); *H04L 63/105* (2013.01); *G06F 2009/4557* (2013.01); *G06F 2009/45595* (2013.01)

(56) References Cited

U.S. PATENT DOCUMENTS

| | | |
|---|---|---|
| 8,412,810 B1 | 4/2013 | Tompkins |
| 8,560,699 B1 | 10/2013 | Theimer et al. |
| 9,009,323 B1 | 4/2015 | Theimer et al. |
| 9,177,338 B2 * | 11/2015 | Collins .................... G06F 21/10 |
| 9,185,171 B2 * | 11/2015 | Pahlavan ................. H04L 63/08 |
| 2009/0063691 A1 * | 3/2009 | Kalofonos ............ H04L 63/102 |
| | | 709/229 |
| 2012/0030069 A1 | 2/2012 | Garg et al. |
| 2012/0089971 A1 | 4/2012 | Williams et al. |
| 2014/0033200 A1 * | 1/2014 | Tompkins ............. H04L 63/061 |
| | | 718/1 |
| 2014/0040473 A1 * | 2/2014 | Ho ........................ G06F 9/5072 |
| | | 709/226 |

OTHER PUBLICATIONS

U.S. Appl. No. 13/967,146 , "Non Final Office Action", dated Jul. 30, 2014, 6 pages.

U.S. Appl. No. 13/967,146 , "Notice of Allowance", dated Dec. 5, 2014, 9 pages.

U.S. Appl. No. 14/683,460 , "Non-Final Office Action", dated Jul. 15, 2016, 12 pages.

U.S. Appl. No. 14/683,460 , "Notice of Allowance", dated Dec. 7, 2016, 5 pages.

* cited by examiner

ENFORCEABLE LAUNCH CONFIGURATIONS

CROSS-REFERENCE TO RELATED APPLICATIONS

This application is a Continuation of U.S. patent application Ser. No. 14/683,460, filed Apr. 10, 2015, issued as U.S. Pat. No. 9,614,873 on Apr. 4, 2017, entitled "ENFORCEABLE LAUNCH CONFIGURATIONS," which is a Continuation of U.S. patent application Ser. No. 13/967,146, filed Aug. 14, 2013, issued as U.S. Pat. No. 9,009,323 on Apr. 14, 2015, entitled "ENFORCEABLE LAUNCH CONFIGURATIONS," which is a Continuation of U.S. patent application Ser. No. 12/979,863, filed Dec. 28, 2010, issued as U.S. Pat. No. 8,560,699 on Oct. 15, 2013, entitled "ENFORCEABLE LAUNCH CONFIGURATIONS," all of which are incorporated herein by reference in their entireties.

BACKGROUND

As an increasing number of applications and services are being made available over networks such as the Internet, an increasing number of content, application, and/or service providers are turning to technologies such multi-tenant resources and cloud computing. These technologies enable customers to access and/or utilize various types of electronic resources, physical or virtual, where the hardware and/or software used to provide these resources can be dynamically scalable to meet the needs of the multiple customers at any given time. A customer typically will rent, lease, or otherwise pay for access to these resources, and thus does not have to purchase and maintain the hardware and/or software to obtain the functionality provided by these resources.

In certain situations, a customer might want to create an instance, such as a compute instance or database instance, in such a multi-tenant environment. In order to provision such an instance, the customer typically has to specify values for a large number of parameters, such as may include an image to use for the instance and a type of machine to run the instance. The customer also might have to specify various credentials, security groups, placement groups, and various other options. It will often be the case, however, that the customer is not an expert in creating these instances and/or will not be aware of optimal parameters or values for a given system or environment at a given time. The customer often has to hire someone to configure the instances, or utilize instances with less than optimal performance, each of which can be undesirable for many customers. Further, a system administrator or other such person for a customer will want to ensure that the individual users or applications for the customer utilize the optimal parameters. Conventional systems do not enable a customer's administrator to easily and accurately specify and enforce the use of specific parameter values and ranges for various users and types of instance.

BRIEF DESCRIPTION OF THE DRAWINGS

Various embodiments in accordance with the present disclosure will be described with reference to the drawings, in which.

DETAILED DESCRIPTION

Figure 1:
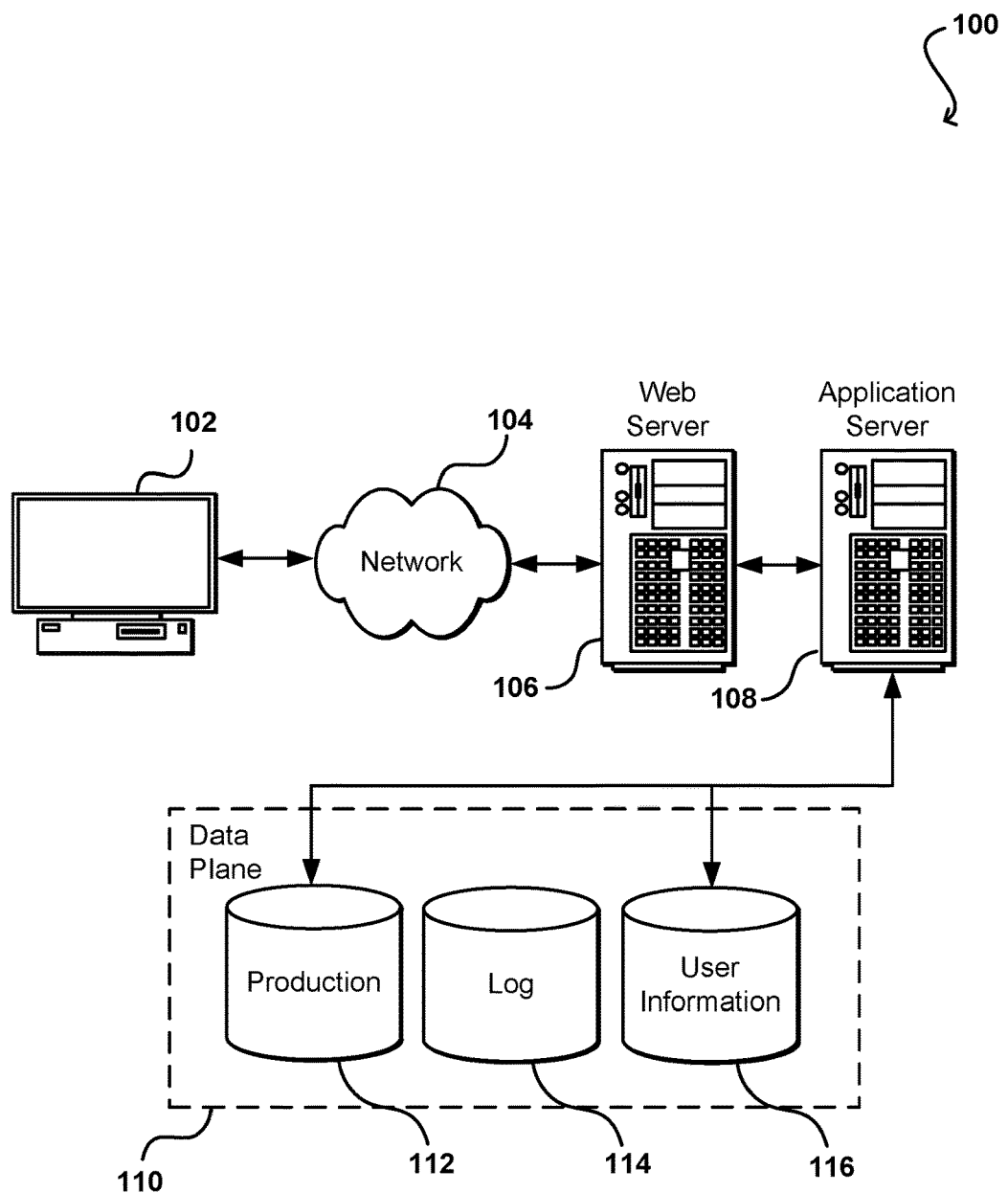
FIG. 1 illustrates an environment in which various embodiments can be implemented.

Systems and methods in accordance with various embodiments of the present disclosure may overcome one or more of the aforementioned and other deficiencies experienced in conventional approaches to enabling customers to utilize and/or instantiate resources in a multi-tenant environment. In particular, approaches in accordance with various embodiments provide one or more launch configurations for each type of resource instance that a customer might want to launch in that environment. Each launch configuration can encapsulate the various parameters for a respective type of instance, such as into a single object or set of values, for example, enabling a customer to launch an instance (or volume, etc.) of a certain type using only a single identifier for, or otherwise specifying, an appropriate launch configuration. There can be multiple launch configurations for an instance type, where each configuration is optimized for at least one type of use or function. For example, one launch configuration might provide better processing speed while another launch configuration might provide greater capacity or throughput, lower latency values, etc. Any of a number of different types of optimizations or variations can be utilized as well as should be apparent in light of the present disclosure. Further, although many examples discussed herein relate to the launching of instances, it should be understood that configurations can be used for various other purposes as well, such as a customer obtaining access to any resource, system, service, or device in such an environment where the customer must specify a variety of parameters for the access.

In some cases, different launch configurations can be available to different customers or types of customer. For example, a large enterprise organization might include employees of various types or categories who are able to launch instances, make calls to instances, or otherwise access shared resources for the enterprise. In many cases, different types of users will have different levels of privileges, and the enterprise would like to be able to control how instances look or function for each type of user. In at least some embodiments, such an organization can specify enforceable and compulsory launch configurations, where each type of employee with access to these shared resources can have an associated launch configuration, as may be defined by a trusted employee, system administrator, etc. And in certain embodiments, a user might not need to know anything about the mandatory launch configuration for that user, as any call from that user for an instance can automatically be associated with the launch configuration for that type of user. Thus, a user can launch an instance with the mandatory parameters without having to specify those parameters or, in at least some cases, even identify the appropriate launch configuration.

The ability to enforce launch configurations can be especially important in situations such as where instances are launched using an isolated set of compute resources via a virtual private network (VPN) connection, which can link the compute resources to the infrastructure for an organization. A specified launch configuration can be constrained to launch only in a specified sub-network using a trusted operating system, using specified security settings and credentials, in a way that is not rootable from the Internet or another external network. Thus, in addition to controlling the types of instance a user is able to launch, the configuration can prevent an unwitting or potentially malicious user from obtaining an entry point into the organization's network.

In some embodiments, a user attempting to launch an instance without using the proper launch configuration can have that launch request rejected and/or a notification sent that the request cannot be completed. In other embodiments, the system might indicate to the user the proper launch configuration to use for the request, such that the user can either approve use of that launch configuration or send another request specifying the configuration. In still other embodiments, the system might automatically adjust the request to specify the correct launch configuration.

Various embodiments provide a separate control environment, or control plane, that can be used to enable a user to specify and manage various aspects of a data environment, or data plane. This "self-service" functionality can be provided via a set of Web services, enabling the user and control plane to act together as a virtual database administrator (DBA). A user or customer can submit a request to the control plane through one of a plurality of externally-visible application programming interfaces (APIs), for example. Various APIs can be used to perform specific functions with respect to various resources in the data environment. A request received to one of the APIs can be analyzed to determine the desired action(s) to be performed in the data plane, such as actions to launch a customer instance, as well as to determine any configuration parameters to be used in launching the instance. A component such as a resource management component can determine the appropriate tasks for the action, ensure that the proper launch configurations are selected, and cause the tasks to be executed in an appropriate order. At least one of these tasks typically will be performed in the data environment, such as to launch or adjust an aspect of a resource instance.

Various other functions and advantages are described and suggested below as may be provided in accordance with the various embodiments.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content. The data store also is shown to include a mechanism for storing log data 114, which can be used for purposes such as reporting and analysis. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for a provider such as an electronic marketplace, wherein multiple hosts might be used to perform tasks such as serving content, authenticating users, performing payment transactions, or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2, discussed in detail below.

Approaches in accordance with various embodiments can be utilized with a system such as may provide a relational database service ("RDS") that enables developers, customers, or other authorized users to obtain and configure relational databases and other such data sources so that users can perform tasks such as storing, processing, and querying relational data sets in a cloud. While this example is discussed with respect to the Internet, Web services, and Internet-based technology, it should be understood that aspects of the various embodiments can be used with any appropriate services available or offered over a network in an electronic environment. Further, while the service is referred to herein as a "relational database service," it should be understood that such a service can be used with any appropriate type of data repository or data storage in an electronic environment. An RDS in this example includes at least one Web service that enables users or customers to easily manage resources and relational data sets without worrying about the administrative complexities of deployment, upgrades, patch management, backups, replication, failover, capacity management, scaling, and other such aspects of data management. Developers are thus freed to develop sophisticated cloud applications without worrying about the complexities of managing the database infrastructure.

An RDS in one embodiment provides a separate "control plane" that includes components (e.g., hardware and software) useful for managing aspects of the data storage. In one embodiment, a set of data management application programming interfaces (APIs) or other such interfaces are provided that allow a user or customer to make calls into the RDS to perform certain tasks relating to the data storage. The user still can use the direct interfaces or APIs to communicate with the data repositories, however, and can use the RDS-specific APIs of the control plane only when necessary to manage the data storage or perform a similar task.

Figure 2:
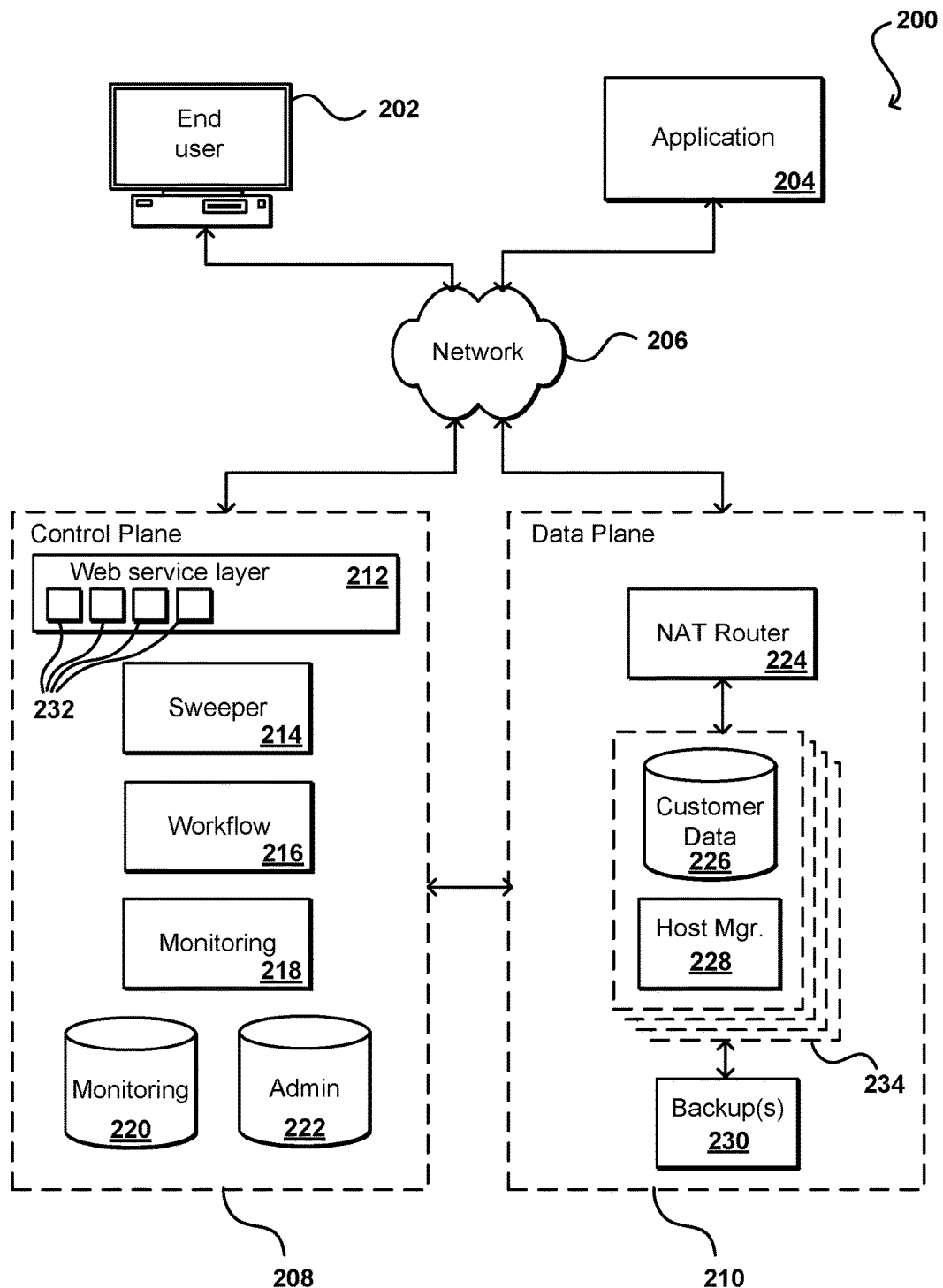
FIG. 2 illustrates an example separation of a control plane and a data plane that can be used in accordance with various embodiments.

FIG. 2 illustrates an example of an RDS implementation 200 that can be used in accordance with one embodiment. In this example, a computing device 202 for an end user is shown to be able to make calls through a network 206 into a control plane 208 to perform a task such as to provision a data repository of the data plane 210. The user or an application 204 can access the provisioned repository directly through an interface of a data plane 210. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation of at least some resources (e.g., hardware and/or software) used to provide the respective functionality.

The control plane 208 in this example is essentially a virtual layer of hardware and software components that handles control and management actions, such as provisioning, scaling, replication, etc. The control plane in this embodiment includes a Web services layer 212, or tier, which can include at least one Web server, for example, along with computer-executable software, application servers, or other such components. The Web services layer also can include a set of APIs 232 (or other such interfaces) for receiving Web services calls or requests from across the network 206. Each API can be provided to receive requests for at least one specific action to be performed with respect to the data environment, such as to provision, scale, clone, or hibernate an instance of a relational database. Upon receiving a request to one of the APIs, the Web services layer can parse or otherwise analyze the request to determine the steps or actions needed to act on or process the call. For example, a Web service call might be received that includes a request to create a data repository. In this example, the Web services layer can parse the request to determine the type of data repository to be created, the storage volume requested, the type of hardware requested (if any), or other such aspects. Information for the request can be written to an administration ("Admin") data store 222, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a geographical region, or near a geographical location, for example, such that the servers are resilient to single data center failures.

The control plane in this embodiment includes what is referred to herein as a "sweeper" component 214. A sweeper component can be any appropriate component operable to poll various components of the control plane or otherwise determine any tasks to be executed in response to an outstanding request. In this example, the Web services layer might place instructions or information for the "create database" request in the admin data store 222, or a similar job queue, and the sweeper can periodically check the admin data store for outstanding jobs. Various other approaches can be used as would be apparent to one of ordinary skill in the art, such as the Web services layer sending a notification to a sweeper that a job exists. The sweeper component can pick up the "create database" request, and using information for the request can send a request, call, or other such command to a workflow component 216 operable to instantiate at least one workflow for the request. The workflow in one embodiment is generated and maintained using a workflow service as is discussed elsewhere herein. A workflow in general is a sequence of tasks that should be executed to perform a specific job. The workflow is not the actual work, but an abstraction of the work that controls the flow of information and execution of the work. A workflow also can be thought of as a state machine, which can manage and return the state of a process at any time during execution. A workflow component (or system of components) in one embodiment is operable to manage and/or perform the hosting and executing of workflows for tasks such as: repository creation, modification, and deletion; recovery and backup; security group creation, deletion, and modification; user credentials management; and key rotation and credential management. Such workflows can be implemented on top of a workflow service, as discussed elsewhere herein. The workflow component also can manage differences between workflow steps used for different database engines, such as MySQL, as the underlying workflow service does not necessarily change.

In this example, a workflow can be instantiated using a workflow template for creating a database and applying information extracted from the original request. For example, if the request is for a MySQL® Relational Database Management System (RDBMS) instance, as opposed to an Oracle® RDBMS or other such instance, then a specific task will be added to the workflow that is directed toward MySQL instances. The workflow component also can select specific tasks related to the amount of storage requested, any specific hardware requirements, or other such tasks. These tasks can be added to the workflow in an order of execution useful for the overall job. While some tasks can be performed in parallel, other tasks rely on previous tasks to be completed first. The workflow component or service can include this information in the workflow, and the tasks can be executed and information passed as needed.

An example "create database" workflow for a customer might includes tasks such as ensuring the proper set of launch configuration parameters is specified for the request, provisioning a data store instance utilizing a set of launch configuration parameters, allocating a volume of off-instance persistent storage, attaching the persistent storage volume to the data store instance, then allocating and attaching a DNS address or other address, port, interface, or identifier which the customer can use to access or otherwise connect to the data instance. In this example, a user is provided with the DNS address and a port address to be used to access the instance. The workflow component can manage the execution of these and any related tasks, or any other appropriate combination of such tasks, and can generate a response to the request indicating the creation of a "database" in response to the "create database" request, which actually corresponds to a data store instance in the data plane 210, and provide the DNS address to be used to access the instance. A user then can access the data store instance directly using the DNS address and port, without having to access or go through the control plane 208. Various other workflow templates can be used to perform similar jobs, such as deleting, creating, or modifying one of more data store instances, such as to increase storage. In some embodiments, the workflow information is written to storage, and at least one separate execution component (not shown) pulls or otherwise accesses or receives tasks to be executed based upon the workflow information. For example, there might be a dedicated provisioning component that executes provisioning tasks, and this component might not be called by the workflow component, but can monitor a task queue or can receive information for a provisioning task in any of a number of related ways as should be apparent.

The control plane 208 in this embodiment also includes at least one monitoring component 218. When a data instance is created in the data plane, information for the instance can be written to a data store in the control plane, such as a monitoring data store 220. It should be understood that the monitoring data store can be a separate data store, or can be a portion of another data store such as a distinct set of tables in an Admin data store 222, or other appropriate repository. A monitoring component can access the information in the monitoring data store to determine active instances 234 in the data plane 210. A monitoring component also can perform other tasks, such as collecting log and/or event information from multiple components of the control plane and/or data plane, such as the Web service layer, workflow component, sweeper component, and various host managers. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each instance 234 in the data plane can include at least one data store 226 and a host manager component 228 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager also perform and/or mange the installation of software patches and upgrades for the data store and/or operating system. A host manger also can collect relevant metrics, such as may relate to CPU, memory, and I/O usage.

The monitoring component can communicate periodically with each host manager 228 for monitored instances 234, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. If a response is not received after a specified number of retries, then the monitoring component can determine that there is a problem and can store information in the Admin data store 222 or another such job queue to perform an action for the instance, such as to verify the problem and re-provision the instance if necessary. The sweeper can access this information and kick off a recovery workflow for the instance to attempt to automatically recover from the failure. The host manager 228 can act as a proxy for the monitoring and other components of the control plane, performing tasks for the instances on behalf of the control plane components. Occasionally, a problem will occur with one of the instances, such as the corresponding host, instance, or volume crashing, rebooting, restarting, etc., which cannot be solved automatically. In one embodiment, there is a logging component (not shown) that can log these and other customer visibility events. The logging component can include an API or other such interface such that if an instance is unavailable for a period of time, a customer can call an appropriate "events" or similar API to get the information regarding the event. In some cases, a request may be left pending when an instance fails. Since the control plane in this embodiment is separate from the data plane, the control plane never receives the data request and thus cannot queue the request for subsequent submission (although in some embodiments this information could be forwarded to the control plane). Thus, the control plane in this embodiment provides information to the user regarding the failure so the user can handle the request as necessary.

As discussed, once an instance is provisioned and a user is provided with a DNS address or other address or location, the user can send requests "directly" to the data plane 210 through the network using a Java Database Connectivity (JDBC) or other such client to directly interact with that instance 234. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 202 or application 204, for example, can be directed to a network address translation (NAT) router 224, or other appropriate component, which can direct the request to the actual instance 234 or host corresponding to the DNS of the request. As discussed, such an approach allows for instances to be dynamically moved, updated, replicated, etc., without requiring the user or application to change the DNS or other address used to access the instance. As discussed, each instance 234 can include a host manager 228 and a data store 226, and can have at least one backup instance or copy in persistent storage 230. Using such an approach, once the instance has been configured through the control plane, a user, application, service, or component can interact with the instance directly through requests to the data plane, without having to access the control plane 232. For example, the user can directly issue structured query language (SQL) or other such commands relating to the data in the instance through the DNS address. The user would only have to access the control plane if the user wants to perform a task such as expanding the storage capacity of an instance. In at least one embodiment, the functionality of the control plane 208 can be offered as at least one service by a provider that may or may not be related to a provider of the data plane 210, but may simply be a third-party service that can be used to provision and manage data instances in the data plane, and can also monitor and ensure availability of those instances in a separate data plane 210.

As discussed, one advantage to providing the functionality of a control plane as a Web service or other such service is that the control plane can function as a virtual system administrator or virtual database administrator (DBA), for example, avoiding the need for an experienced human administrator to perform tasks such as verifying launch configurations and provisioning data. Many conventional approaches require such a human administrator to receive the necessary configuration information, determine whether the configuration is valid, optimize and tune the instance, and perform other such tasks, which take a significant amount of time and effort. Further, such an approach provides many opportunities for error. The ability of a user to specify these parameters, however, can cause the user to launch instances or otherwise access resources in ways that are not optimal for the current network or system environment. Specifying a specific launch configuration when submitting a request to a control plane or service as described herein, a user or customer can obtain optimal (or at least appropriate or allowed) performance for resource access. The control plane can perform the necessary tasks to create, launch, delete, modify, expand, and/or otherwise manage a resource or resource instance in response to the request. The control plane also can support several different types of resource in a consistent fashion, without requiring an expert in each type of resource.

Figure 3:
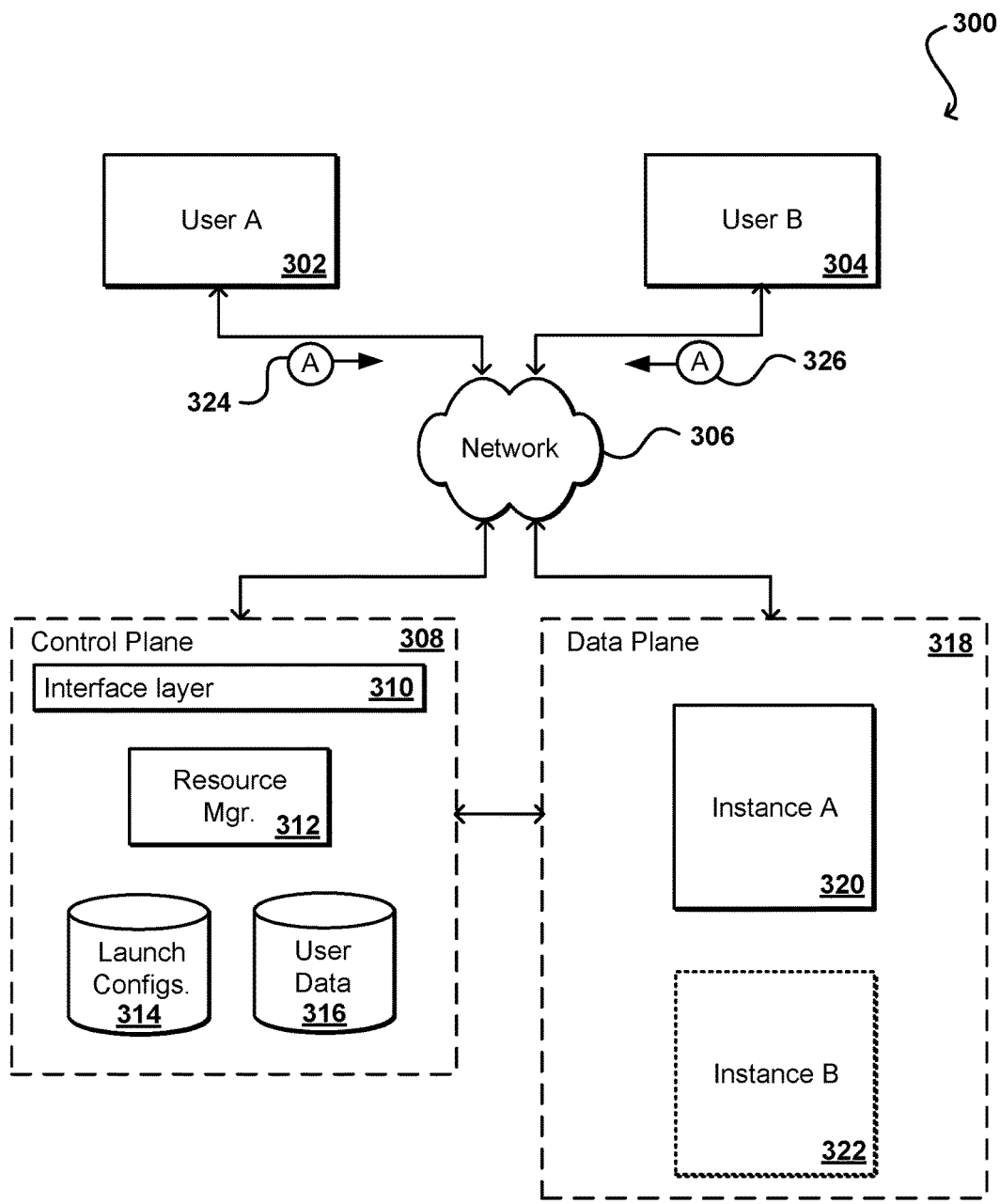
FIG. 3 illustrates an example system for landing requests from different users with different associated launch configurations that can be used in accordance with various embodiments.

FIG. 3 illustrates an example situation in a multi-tenant resource environment 300 wherein two users 302, 304 are of a different type with different access privileges. It should be understood, however, that while a multi-tenant environment might be able to support multiple users concurrently, such an environment does not require more than one user being active at any given time. Further, portions (e.g., a dedicated sub-environment) of such an environment might be provided that is not multi-tenant in nature. As discussed above, each of these users can have at least one associated launch configuration that can be used to specify parameters to be used in launching an instance or otherwise accessing or utilized a shared virtual resource. In this example, each user is able to send a request across at least one network 306 to an interface layer 310 of a control plane 310, whereby a resource manager 312 or other such component is able to cause one or more instances to be launched in the data plane 318. User A 302 submits a request 324 specifying launch configuration A. The resource manager 312 is operable to extract an identifier or other such information from the request and check that information against information in the user data store 316, for example, in order to determine whether User A is of a type capable of using launch configuration A to launch instances. In this case, User A is determined to be of the type capable of utilizing configuration A, such that the resource manager can pull parameter values and/or other such information from a launch configuration data store 314, for example, and submit one or more requests into the data plane to launch an instance of type A 320 in the data plane. Instance A will be launched and configured according to the parameter values of launch configuration A.

Similarly, User B 304 is of type B, and thus is capable of launching instances using launch configuration B. In this example, however, User B 304 submits a request 326 specifying configuration A. The resource manager 312 can check the information in the user data store 316 and determine that User B is not allowed or authorized to utilize the values of launch configuration A to launch an instance. In some embodiments, the resource manager 312 can cause the request to be denied since the request does not specify an appropriate launch configuration for that user. In other embodiments, the resource manager can send a message to User B 304, indicating that the user specified a configuration to which the user does not have rights, and can ask the user to submit a new request specifying an appropriate configuration and/or asking the user to agree to allow the system to launch the instance using configuration B. In some embodiments, the system might send a notification to User B indicating to the user that the instance will instead be launched using one or more parameter values from configuration B, and in at least some embodiments will enable the user to confirm or cancel the launching of the instance using those values. In still other embodiments, the system might automatically launch an instance of type B 322 for User B using the parameter values from configuration B. Instance B is 322 illustrated using a dotted line in FIG. 3 because in many of these and other embodiments the instance will only be launched in cases where User B in some way consents to the instance being launched using one or more parameters different from those specified in the original request.

Figure 4:
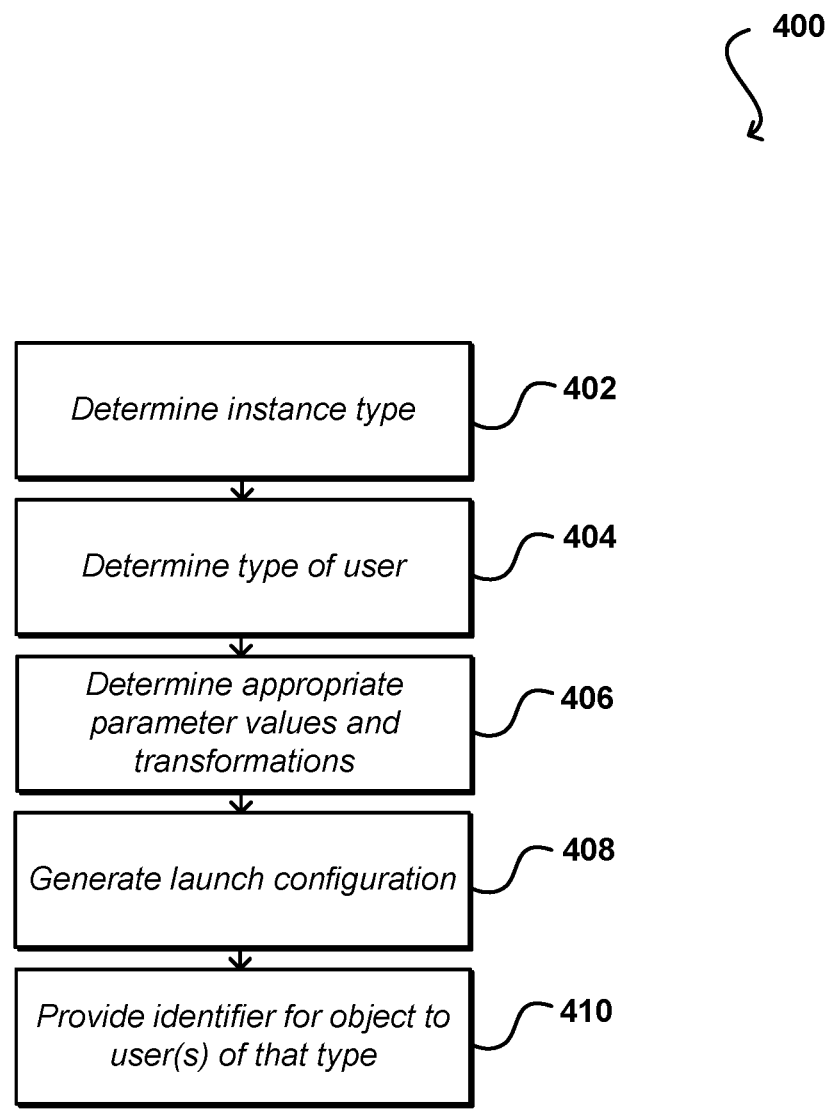
FIG. 4 illustrates an example process for providing launch configurations for types of request that can be used in accordance with various embodiments.

FIG. 4 illustrates an example process 400 that can be used to generate and/or associate one or more launch configurations with each of these and/or other types of user. It should be understood for this and other processes disclosed herein that there can be additional, fewer, or alternative steps performed in similar or alternative orders, or in parallel, within the scope of the various embodiments unless otherwise stated. In this example, a type of instance and/or resource is determined for which launch configurations are to be specified 402. As discussed, different types of parameters might need to be specified for different types of resources, such as for compute nodes or storage nodes, as well as the types of instance capable of being provided for each type of resource. In this example, one or more types of user are also determined 404, where each type of user might have different values specified for each of the parameters of a given instance type, based on information such as access rights and security privileges. Using at least this information, an appropriate entity such as a system or network administrator can determine appropriate parameter values (or value ranges) and/or transformations for each combination of user type and instance type, and can generate a launch configuration for each of those sets 408 (although in some instances a launch configuration might be the same for more than one type of user and/or type of instance). In some embodiments, one or more transformations might be specified in order to determine how to change or manage values submitted with a request that may not comply with certain rules or policies set for the instance type, such as to automatically adjust a specified parameter value that falls outside an allowable range. Users then can be provided with an identifier, or other information, useful in specifying a launch configuration for that type of user 410. In some embodiments, a user can be provided with identifiers for multiple launch configurations that can be used by that type of user, along with information for each configuration, such that the user can specify an appropriate configuration based upon a task, type of request, or other information associated with an instance to be launched or configured for that user. One or more rules can be applied that ensure proper configurations are specified, and that any configurations or values falling outside allowable values or ranges are transformed accordingly. In some embodiments, there might be constraints placed on only a subset of the parameter values, such that users might be able to specify any appropriate value for some parameters but must specify certain values or ranges of values for other parameters. The number and/or selection of constraints can depend upon any number of factors, such as the type of user or instance, etc.

Figure 5:
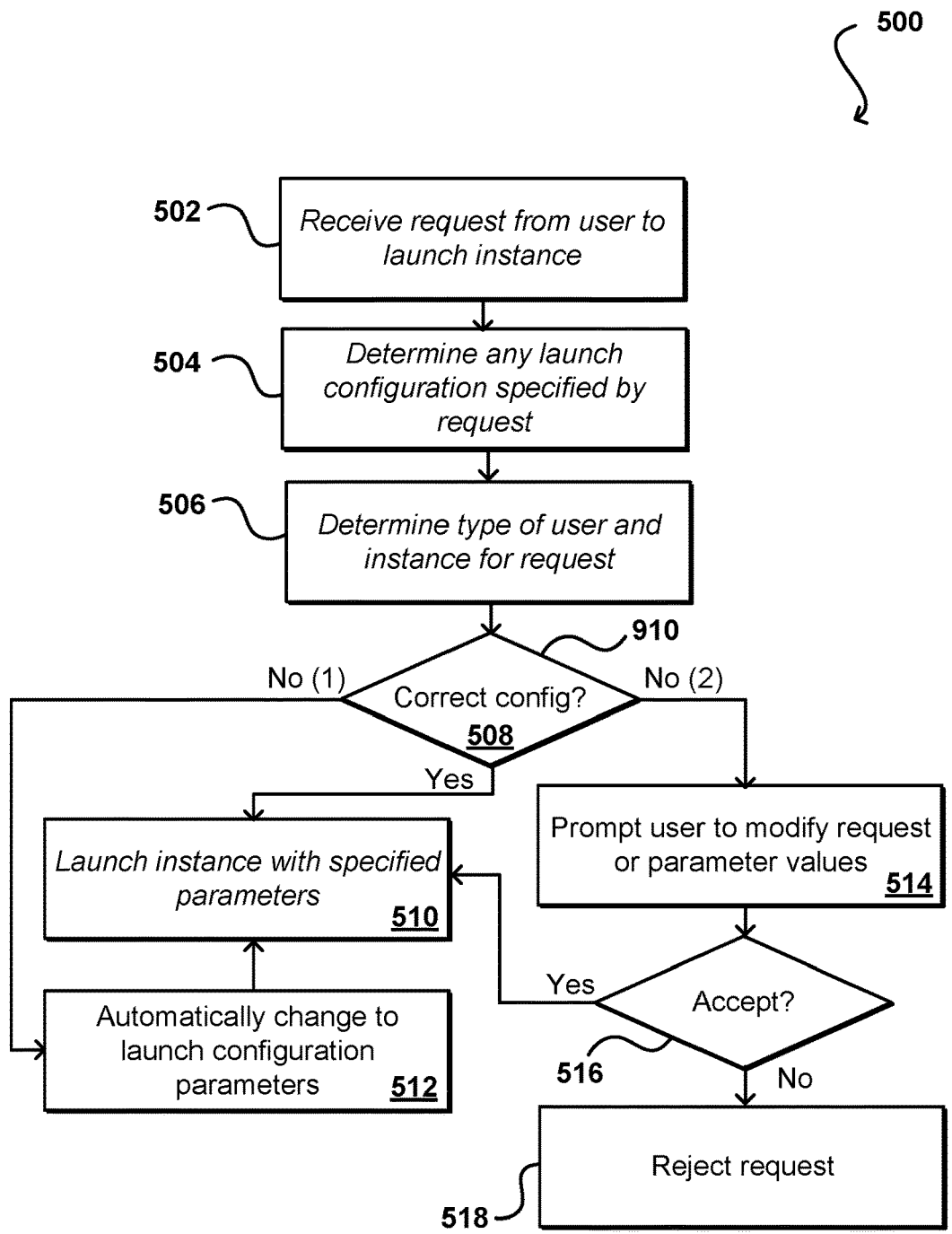
FIG. 5 illustrates an example process for processing launch requests that can be used in accordance with various embodiments.

FIG. 5 illustrates an example process 500 that can be used to process a request received from a user, where the user is associated with one or more launch configurations using a process such as that described with respect to FIG. 4. In this example, a request is received from a user to launch an instance 502. A determination is made as to any launch configuration specified by the request 504, such as where the request includes an identifier for a specific configuration. Based upon information such as user data, session data, a sending address of the request, etc., a type of the user associated with the request can also be determined 506. If it is determined that the request specifies an appropriate launch configuration for that type of user 508, an instance can be launched according to the parameter values specified by that configuration. If the request specified a configuration to which that type of user does not have privileges, or if the request does not specify a valid configuration, a variety of different actions can be taken based upon the type of user, system configuration, or other such information. For a first action, the user can be prompted to change to the appropriate launch configuration 514, whether by confirming user of that configuration, sending a new request, specifying additional parameters, etc. If the user accepts the suggested configuration, the instance can be launched accordingly 510. If the user does not accept that configuration, the request can be denied 518. In some cases, a request specifying an inappropriate or incomplete launch configuration can be processed and the values for the request automatically added or adjusted to those specified by the appropriate launch configuration 512, and the instance launched accordingly 510. As discussed above, in some cases the user can be notified that the parameter values for the instance have been changed before the instance is launched, such that the user has the ability to cancel the request if desired or where the new parameter values will not work for the application for which the instance is being launched. In some cases, security settings might be added, applied, or augmented automatically where necessary, while various other customer-noticeable aspects such as instance sizes might be brought to the attention of the user for confirmation before being added or adjusted, etc. Various other options are available as well, such as enabling the user to utilize those parameter values but charging the user extra for the instance. In some instances, an alert or notification might be generated for a system administrator or monitoring portal that a user is attempting to launch an instance using an inappropriate launch configuration, such that an appropriate remedial action (e.g., warning or change in service) can be taken.

Such approaches enable a set of allowed launch configurations to be specified that users or customers may invoke with respect to a given environment, such as a particular multi-tenant or shared resource environment. As discussed, in some cases certain users might only be able to utilize certain of these configurations, while in other cases any user can utilize a launch configuration appropriate for the type of instance or resource, etc. In some embodiments, certain launch configurations can be specified by certain principals (i.e., users or users assuming particular roles) under certain conditions. In some embodiments, conditions such as network load and available resource types can be used in determining whether a user can specify a particular launch configuration at any given time. In some embodiments, a user might be allowed to launch a certain number of instances with a first launch configuration, and might be limited to a second launch configuration for additional instances. Various other approaches can be utilized in accordance with the various embodiments as should be apparent in light of the present disclosure.

In some embodiments, one or more policies can be utilized to specify restrictions on who (e.g., individual users or types of users) can employ a given launch configuration. In some cases, each network or development team can specify a policy determining how a type of instance should be configured for a type of user without having to utilize a proxy, which acts as a single choke point for handling all those launches. The user can instead be provided with the appropriate launch configuration information and call the resource provider directly. There can be a single policy for an instance type or multiple policies, such as one for the resource performance configuration and one for security, ensuring that resources are not wasted or instances run in a non-optimal matter while ensuring the integrity and security of the use of those resources.

In some embodiments, various policies can interact. For example, a user might have a policy specified that the user can create certain types of instances, and another policy that each of these types of instances must comply with a given naming policy. In some embodiments, each instance might have to have a tag associated with that user according to another policy. In any of these cases, the policies might refer to each other and/or one or more configurations might be utilized for a given instance and/or customer.

Further, configuration and/or policy information can be hierarchical and inherited from multiple sources. For example, an image might specify that an instance can only be launched with one of two specific kernels and only on certain instance types. Further, a subnet might specify that an instance must be launched with a particular security group or security settings. Thus, the launch configuration might not be a single configuration from a single source, but can be built up or constructed out of constraints from various sources.

In one embodiment, an access policy language can be used to specify bucket policies, as well as policies associated with users (and groups of users) underneath a given Web services account. This is publicly exposed and documented functionality. Instead of providing access control lists (ACLs) and capabilities, a user can be allowed to create a bucket where an ACL must appear on the bucket. A set of resources, such as a subnet, router, AMI, or snapshot, then can be in-scope for a given type of request. In some cases, each of these resources would have an opportunity to donate policy to the evaluation. For every resource or set of resources involved, one or more policies can be obtained (where determined to be applicable) for use in determining how and/or whether to process or augment a given request, whether to notify the user of an alternative request that could be processed, whether to add missing parameter values, etc.

An advantage to utilizing launch configurations is that a security team or network configuration team can have flexibility to enforce limits on certain types or ranges of operations, instead of having to limit all types of user by locking down certain functionality completely. Such an approach can unblock innovation at large companies where users are not required to all meet the same network and/or security constraints. For example, users can be allowed to utilize different sub-nets or launch instances of different sizes based on any of a number of factors as discussed elsewhere herein.

The launch configurations themselves can include a lot of expertise that would generally not be available to the average user. For example, a database administrator (DBA) can develop one or more configurations that are optimal for database instances of a given type for a given network configuration. And in some cases, a DBA might also tune one or more kernels for specific database operations, and might specify those kernels in different configurations. The launch configurations thus are not simply about prescriptive constraints as to what a user can or cannot do, but can provide optimal settings for a variety of users. This can be advantageous at least for the fact that the user does not have to know specifics of security groups and other aspects, as those settings are specified automatically.

As discussed, launch configurations are not limited to database instances or virtual compute nodes, for example, but can be applied to anything that can be launched or configured in an environment such as a multi-tenant, virtualized resource environment. Different configurations also can be specified for any appropriate user, group, or account level or type. Different configurations also can be specified based on information such as where the resources are located, the time of the request, and other such information.

In at least some embodiments, the launch configurations are not application-specific but rather application class-specific. For example, a given launch configuration might be able to apply to a set or category of actions, which can apply to one or more applications. Multiple applications might be able to be executed that can all run within the guidelines of an enforceable launch configuration. In such a situation, a user might be given an overall "sandbox" or complex environment, which can include different types of resources, in which the user can operate for a given type or class of actions or applications.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase °, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:

Receiving, by a computer system from a computing device of a user, a request to launch a virtual instance, the request identifying a launch configuration for the virtual instance available from a data store;

accessing, by the computer system, the launch configuration from the data store based at least in part on the request, the launch configuration defining values for parameters of the virtual instance;

determining, by the computer system based at least in part on whether the launch configuration identified in the request is associated with a type of at least one of the virtual instance or the user, whether the user is authorized to use the launch configuration to launch the virtual instance according to the values defined by the launch configuration; and launching, by the computer system, the virtual instance based at least in part on whether the user is authorized to use the launch configuration.

2. The computer-implemented method of claim 1, wherein determining whether the user is authorized to use the launch configuration comprises:

determining the type of the user based at least in part on the request;

determining that the launch configuration is available for the type of the user based at least in part on a user type to which the launch configuration is designated; and wherein launching the virtual instance comprises:

using the values defined by the launch configuration based at least in part on the determining that the launch configuration is available for the type of the user.

3. The computer-implemented method of claim 2, wherein the launch configuration is determined to be available based at least in part on access rights or security privileges of the user.

4. The computer-implemented method of claim 2, wherein determining whether the user is authorized to use the launch configuration comprises:

determining the type of the user based at least in part on the request;

determining that the launch configuration is unavailable for the type of the user based at least in part on a user type to which the launch configuration is designated;

wherein launching the virtual instance comprises:

performing a remedial action if the launch configuration is determined to be unavailable for the type of the user, the remedial action comprising modifying at least a portion of the values, wherein:

the virtual instance is associated with an instance type, the portion of the values is modified based at least in part on one or more rules, and the one or more rules define modifications to the values based at least in part on a combination of the instance type and the type of the user.

5. The computer-implemented method of claim 1, wherein the virtual instance is associated with an instance type, wherein determining whether the user is authorized to use the launch configuration comprises determining that the launch configuration identified in the request is designated for a different instance type, and further comprising:

performing a remedial action to launch the virtual instance based at least in part on the launch configuration being designated for the different instance type.

6. The computer-implemented method of claim 5, wherein the remedial action comprises prompting a submission of another request identifying a different launch configuration designated for the instance type.

7. The computer-implemented method of claim 5, wherein the remedial action comprises augmenting or replacing one or more of the values to correspond to appropriate values of the instance type.

8. The computer-implemented method of claim 5, wherein the remedial action is based at least in part on a determination that the virtual instance and the launch configuration are associated with different instance types.

9. One or more non-transitory computer-readable media comprising instructions that, upon execution with one or more processors, cause a system to perform operations comprising:

receiving a request for a computing resource to be hosted on a network, the request associated with a user and identifying a configuration for the computing resource;

determining, based at least in part on whether the configuration identified in the request is associated with a type of at least one of the computing resource or the user, whether hosting the computing resource according to the configuration is authorized for the user according to values for parameters defined by the configuration; and hosting the computing resource on the network based at least in part on the determining of whether hosting the computing resource according to the configuration is authorized for the user.

10. The one or more non-transitory computer-readable media of claim 9, wherein the request for the computing resource comprises information associated with at least one of: launching a volume, accessing a network resource, or instantiating a virtual instance.

11. The one or more non-transitory computer-readable media of claim 9, wherein the request further specifies the type of the computing resource, and wherein determining whether hosting the computing resource is authorized comprises:

determining whether the configuration is designated for the type of the computing resource;

using the values defined by the configuration if the configuration is determined to be designated for the type of the computing resource; and performing a remedial action if the configuration is determined to be designated for a different type of the computing resource, the remedial action comprising modifying at least a portion of the values.

12. The one or more non-transitory computer-readable media of claim 11, wherein the portion of the values is modified based at least in part on one or more of: the type of the user, a usage type, or an application type associated with the computing resource being hosted on the network.

13. The one or more non-transitory computer-readable media of claim 9, wherein the configuration is designated for the type of the user.

14. The one or more non-transitory computer-readable media of claim 13, wherein the computing resource comprises a virtual instance, and wherein the configuration encapsulates the values for the parameters of the virtual instance.

15. The one or more non-transitory computer-readable media of claim 14, wherein the virtual instance is associated with an instance type, and wherein at least a portion of the values is defined based at least in part on the instance type and a target environment for hosting the virtual instance.

16. The one or more non-transitory computer-readable media of claim 14, wherein the virtual instance is associated with an instance type, and wherein the operations further comprise:

determining that the configuration identified in the request is designated for the instance type; and using at least a portion of the values to launch the virtual instance based at least in part on the configuration being designated for the instance type.

17. A system comprising:

one or more processors; and one or more memories comprising computer-readable instructions that, upon execution with the one or more processors, cause the system to at least:

receive a request for a virtual instance to be hosted in an environment, the request associated with a user and identifying a launch configuration of the virtual instance;

determine, based at least in part on whether the launch configuration identified in the request is associated with a type of at least one of the virtual instance or the user, whether the user is authorized to use the launch configuration to launch the virtual instance according to values for parameters defined by the launch configuration; and launch the virtual instance in the environment based at least in part on whether the user is authorized to use the launch configuration.

18. The system of claim 17, wherein the user is determined as not being authorized to use the launch configuration, and wherein launching the virtual instance comprises:

modifying at least a value of the values without user input, wherein the value is associated with a security parameter of the parameters, and wherein the virtual instance is launched based at least in part on the value being modified.

19. The system of claim 17, wherein the user is determined as not being authorized to use the launch configuration, and wherein launching the virtual instance comprises:

modifying at least a value of the values based at least in part on sending a notification to a computing device of the user about the user not being authorized, wherein the value relates to an aspect of the virtual instance displayable at a user interface, and wherein the virtual instance is launched based at least in part on the value being modified upon receiving a modification to the value from the computing device of the user.

* * * * *

UNITED STATES PATENT AND TRADEMARK OFFICE
CERTIFICATE OF CORRECTION

PATENT NO. : 10,469,500 B1
APPLICATION NO. : 15/470495
DATED : November 5, 2019
INVENTOR(S) : Marvin M. Theimer et al.

It is certified that error appears in the above-identified patent and that said Letters Patent is hereby corrected as shown below:

In the Claims

Column 16, Line 31, Claim 1:
Delete "Receiving, by a computer system from a computing"
Insert --receiving by a computer system from a computing--

Signed and Sealed this
Fifth Day of May, 2020

Andrei Iancu
*Director of the United States Patent and Trademark Office*